Oct. 7, 1969  E. LAGEMANN  3,470,992
HYDRAULIC GEAR PUMP RETARDER AND ROLLER COMBINATION
Filed Sept. 21, 1967
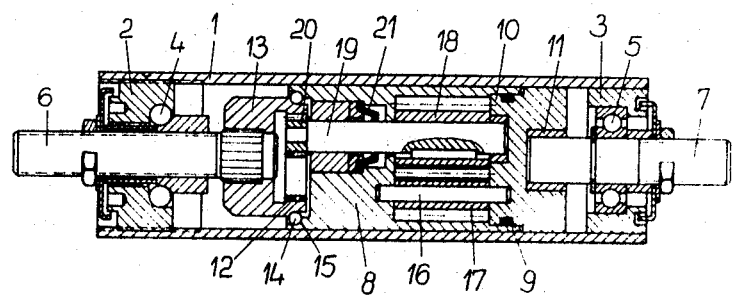
ERWIN LAGEMANN
Inventor

3,470,992
**HYDRAULIC GEAR PUMP RETARDER AND
ROLLER COMBINATION**
Erwin Lagemann, 47 Blucherstrasse 59,
Siegen, Germany
Filed Sept. 21, 1967, Ser. No. 669,492
Int. Cl. B65g *13/00;* F16d *67/02, 57/00*
U.S. Cl. 193—35            8 Claims

ABSTRACT OF THE DISCLOSURE

This invention relates to a braking roller for use in a conveyor and, more particularly, to such a roller having an outer tube and a pair of fixedly mounted stub shafts on which the tube is rotatably supported, there being a braking device located between the tube and the shaft having a liquid as a braking medium.

BACKGROUND OF THE INVENTION

Braking rollers of the type with which the present invention is concerned have been constructed in the past in accordance with several designs. One type which has been used contains gearing which drives a flywheel. The difficulty experienced with this type of machine is that the flywheel wears out rapidly and friction wear on the surface of the roller takes place in very little time. Furthermore, during acceleration of the gears, the rolls are subjected to pulsating stresses which are applied to the conveyor during high speed operations so that the life span of the rollers can be very short. Braking rollers which are driven electrically are expensive, so that it is uneconomical to provide such rollers in horizontal conveyors because of the large number of such rolls which have to be used. It is also well known to provide braking rollers having a sealed space surrounded by the outer cover of the roller, which space is filled with a liquid of high viscosity; special hydrodynamic bodies are connected with the shaft and with the cover of the roller and these bodies are driven during the turning of the roller. Turbulence and similar viscous damping draws energy from the movement of the roller and thus retards the speed. This kind of braking roller is not too expensive and also are practical and subject to very little wear; however, the disadvantage is that they provide very little braking force. These and other difficulties experienced with the prior art devices have been obviated in a novel manner by the present invention.

It is, therefore, an outstanding object of the invention to provide a braking roller which constitutes an improvement over braking rollers having simple liquid as a braking medium.

Another object of this invention is the provision of a braking roller which has a braking force which increases with the speed of operation.

A further object of the present invention is the provision of a braking roller which not only has a high braking force but, in addition, may be highly stressed by heavy loads without damage.

It is another object of the instant invention to provide a braking roller which is in a position to brake material transported on a conveyor, which material is heated to high temperatures which, in the prior art, would cause braking rollers to suffer damage and to change their braking coefficient.

SUMMARY OF THE INVENTION

In general, the present invention involves a braking roller for use in a conveyor comprising a roller tube, a pair of fixedly mounted stub shafts on which the tube is rotatably supported, and a braking device located between the tube and the shafts and having a liquid as a braking medium. The braking device includes a hydraulic pump operated by relative movement between the tube and the shafts.

BRIEF DESCRIPTION OF THE DRAWINGS

The character of the invention, however, may be best understood by reference to one of its structural forms, as illustrated by the accompanying drawings, in which:

FIG. 1 is a longitudinal sectional view of a braking roller embodying the principles of the present invention, FIG. 2 is a longitudinal sectional view of a braking roller constituting a modification of the roller shown in FIG. 1, FIG. 3 is a transverse sectional view taken on the line III—III of FIG. 2, FIG. 4 is a transverse sectional view of a modification of a portion of the device shown in FIG. 2, and FIG. 5 is a transverse sectional view of a still further modification of a portion of the roller.

FIG. 1 shows a braking roller having an outer cover or tube 1 which is rotatably supported on stub shafts 6 and 7 by means of inwardly-directed flanges 2 and 3 carrying bearings 4 and 5. The outer ends of the shafts are threaded for fixedly mounting in a conveyor or the like. Also arranged within the roller tube 1 is a pump housing 8 which is connected to the tube so as to prevent turning and displacement. A seal 9 is associated with the housing 8 and is provided with a cover 10. Within the housing cover is arranged a friction bearing 11 in which is supported the inner end of the stub shaft 7. The end of the shaft 6 lying within the space surrounded by the tube 1 has mounted on it an element 13 which is provided with internal gear teeth 12. The element 13 is supported externally by a ball bearing 14 which contacts a suitable annular surface 15 formed in the pump housing 8.

A bore is provided in the pump housing 8 as well as a bore in the housing cover 10 to maintain in place a shaft 16 on which is supported a gear-type rotor 17. A mating rotor 18 engages the rotor 17 and is mounted on a shaft 19 and keyed thereto. The shaft 19 has mounted on its outer end a pinion 20 which engages the internal teeth 12 of the element 13. The pump housing is filled with a liquid and the housing chambers on either side act as pressure and suction chambers for the gear pump formed by the rotors 17 and 18, the housing chambers being designed without any special connecting path. The pump is sealed against loss of liquid by a housing seal 9 and a gasket 21 surrounding the drive shaft 19. The only connection between the pressure and suction chambers is provided by the space between the gear-type rotors 17 and 18 on one side and the walls of the pump housing 8 surrounding the gear wheels and the housing cover 10 on the other side. The dimensions and tolerances of the space are selected in such a way that, in connection with the viscosity of the braking medium, the desired braking characteristic is obtained.

At the start of operation of the braking roller in a practical installation, there is a complete pressure equilization of the pressure liquid through the above-mentioned space, so that the braking roller may be rotated in either of the two directions without any resistance being encountered. In case an object being transported over the conveyor meets the braking roller (which is at rest), this action rotates the roller tube 1 and pulls it along with the pump housing 8. Also, the drive shaft 19 supported by the pump housing takes part in this movement and its pinion 20 rotates within the inside gear 12 of the element 13 which is fixedly mounted on the shaft 6. The element 13 does not take part in these movements, since the shaft 6 is fixedly mounted at the side of the conveyor. Through the circular movements of the drive shaft 19 and the pinion 20, the drive shaft 19 is rotated in a manner corresponding to the kinetic relationship between planetary gears and rotates the gear rotor 18. This operates with the mating gear-type rotor 17 in the manner of a gear-type pump, so that these two gear rotors start to work. As already mentioned, at rest position there is a complete pressure equilization of the liquid within the pump housing created by the space in the circumference of the gear rotors, so that, at the time of startup, no appreciable brake resistance is available. As the speed of movement of the object carried on the conveyor increases, this results in increased speed of rotation of the braking roller and the gear rotors 17 and 18. The pressure liquid is, therefore, transferred by the gear pump from the suction chamber to the pressure chamber. In passing from the housing chamber (which is under pressure) to the opposite suction housing chamber, the liquid is allowed to flow only by overcoming the considerable resistance of the space formed by the gear rotors 17 and 18. Therefore, during the operation of the pump, a relatively high pressure is brought about which transfers a high braking force to the areas of action of the rotors 17 and 18. This force or resistance is directed to the roller tube 1 and, therefore, retards the movement of the object passing over the roller. This action is reinforced by the gear ratio of the pinion 20 and the internal gear 13. The revolutions of the roller tube will be transferred to the gear pump so that by the pump's higher speed higher pressure is built up. These higher pressures cause a higher braking resistance which is still further increased by the reduction gear from the gear pump to the roller tube.

The braking roller of the present invention is particularly useful because it has a very small starting resistance. When it stands still, a completely equalized pressure is present and the counter pressure activating the brake force appears only when the gear pump is moving. Therefore, the first phases of rotation take place practically without any resistance, which resistance increases only with the increase of rate of rotation. These circumstances are responsible for the fact that the mechanical parts of the braking roller (even during the passage of fast-moving transported material) are not exposed to pulsating stresses and, therefore, do not have to be designed for overload and have practically no wear. A fast-rolling load has only the braking roller itself to accelerate at the moment when it passes over the roll for the first time. Only with the increase in rate of rotation is pressure built up within the gear pump; this creates a counter-force or brake force which, after going through a suitable rotation, for example, 90° to 120°, arrives in the vicinity of a so-called "fixed end value" and closes into it asymptotically. This fixed end value of the braking resistance depends on the speed where the exponent is larger than the value 1, so that, the speed of the rolling transported material is fixed and can be easily limited to a predetermined value and where the achieved corresponding inspeeds are largely independent of the weight of the material transported; or, the slope of the transportation surface. Furthermore, it has the advantage that, by using predetermined dimensions of a braking roller, its braking characteristics can be selected for a predetermined value, so that a braking liquid of a corresponding viscosity may be used. Therefore, it is possible, for example, that a braking roller which was to be used originally for heavy loads may be converted to carry at higher speeds by exchanging the originally-provided braking fluid for a fluid of lower viscosity.

Another specific design of the braking roller is shown in FIG. 2 and is especially intended for use with heavy loads. In order to stiffen the construction, a roller tube 22 is additionally surrounded by a second concentric outer tube 23 which carries the load of the heavy conveyed material directly. It transfers the load to the flanges 24 and 25 without introducing the load to the inside tube. Elastic deformations of the mechanically-driven parts of the braking roller will be prevented in this way, even when the heaviest type of material is carried. When this deflection is prevented, a proper operation of the basic mechanism and the parts which have to stay within certain tolerances is achieved. Furthermore, it is possible to increase the friction coefficient and also provide for the reception of shocks due to rapidly moving conveyed material by providing the outer tube 23 with a cover of rubber or plastic. There is no danger of heat accumulation, since the heat created within the gear pump may be transferred through the tube 22 which is not covered. The heat exchange is brought about satisfactorily by the provision of holes 26 in the flanges 24 and 25 in the areas between the tubes and this allows the passage of air.

The use of an outer tube 23 separated from the main roller tube 22 permits the use of the braking rollers for carrying material of high temperature; for instance, red-hot bars which, otherwise, would influence the braking roller or its function. Such red-hot material rests, in this case, on the outer tube 23 which is thermally insulated by the layer of air between the tubes 23 and 22. The air which passes through the holes 26 in the flanges brings about heat transfer by its velocity. Because the heated air leaves the space between the tubes through the opposite flange holes, this flow acts as a cooler for the tube 22 as well as for the tube 23.

In the braking rollers shown in FIG. 2, the element 27 (having inside gear teeth) is rotatably supported by a friction clutch 29 on a shaft 28. The driving connection which is provided to transmit the torque between the shaft 28 and the toothed element 27 which drives the gear pump is brought about by the friction clutch 29. By this means a part 30 is connected with the shaft 28 and a counter part 31 is connected to the toothed body or element 27. By the use of a friction clutch, where the friction surfaces are, for example, kept in constant touch by means of a spring, it is possible to achieve a desired limit of maximum torque especially in cases where the braking rollers are used for particularly heavy loads. Upon exceeding the maximum torque, the friction clutch yields and the element 27 is able to turn with respect to the shaft 28. It has also proven to be of advantage to make the forces which keep the friction surfaces of the clutch together dependent on the distance. For example, it may be provided that, during the start of rotation of the roller, the element 27 turns together with the pump housing 32. Then, upon change to a higher rate of rotation, the clutch part 31 comes into tight connection with the driven part 30 of the friction clutch 29, so that he shaft 28 is connected with the element 27. This may be achieved, for example, by mounting the secondary element 31 of the clutch on a screw thread formed on the primary drive 30 or on the shaft 28. After the braking roller is relieved by a spring and by the start of turning, the drives are pushed against the opposite friction area. By these means, in addition to the limiting of the braking force, one can achieve special favorable running characteristics for higher loads.

Other beneficial clutching devices for improving the characteristics of heavy-duty braking rollers may be used in combination with the friction clutch 29 or may take the place of such a friction clutch. In FIG. 4, for example, the construction makes use of a claw-clutch which is shown in cross-section as integral with the shaft. FIG. 4 does not show the spring elements which are used in the device, but these are well-known in the art. With the spring, the primary and secondary parts of the clutch are pushed against each other in starting position in such a way that at the start of operation both clutch parts are twisted against the spring pressure for approximately 60° before the claw areas of the clutch which are free in start position come together. Then, the primary and secondary parts are in tight working position for driving operation. In this case one can develop easy starting for braking rollers which are designed for the highest type of braking force.

FIG. 5 shows a free-wheeling clutch which permits the design of braking rollers where the brake forces during start-up may take place in only one of two directions and a backward motion of the load can take place on the braking roller without any inhibition. By this arrangement, it is possible to feed material from the front side of a platform conveyor as is sometimes desirable without the necessity of overcoming the braking resistance of all the loaded braking rollers. On the other hand, transportation conveyors may be erected by which it is possible to have return movement within a common program. The free wheeling clutch 34 is designed integrally with the primary part 35. As shown in FIG. 5, the secondary part 36 of the clutch is formed as an extension of the body 27 and has the shape of a tube; the primary part 35 contains rollers 37 in grooves 38 which are wedge-shaped. Upon counter-clockwise turning of the secondary part, the rollers 37 will be guided into the enlarged areas of the grooves 38 and will loosen the connection of the two parts. On the other hand, by turning the secondary part clockwise, the rollers 37 are forced into a narrow part of the grooves 38 until the rollers 37 which are wedged in the grooves and the parts are firmly connected.

The characteristics of the braking rollers as shown in FIG. 2 may be further enhanced when the housing chambers arranged on the pressure and suction sides of the gear pump are connected with each other by a pressure equalization channel 40. This channel is formed in the housing cover and the cross-section of the channel may be adjusted to any desired area by means of a control screw. In case higher transportation speeds need to be achieved on a conveyor with a predetermined slope and a predetermined transported material, the control screw 41 can be moved out of the channel 30 so that the pressure liquid flow brought about by the gear pump may flow from the housing chamber on the pressure side to the housing chamber on the suction side with less pressure difference; that is to say, with less pressure build-up. Corresponding to the lower pressure build-up and at a predetermined rate of revolution (with a predetermined pumping capacity of the gear pump), the brake force is reduced. The control screw 41 may also be used for filling up the cavities with pressure fluid, or in case a special screw is used (which screw is not shown in the drawings), the screw may be removed completely for the bleeding of air. For practical purposes, the control screw is equipped with a locking device to prevent involuntary adjustments during operation. For the adjustment to a desired braking resistance, the control screw is made accessible by the corresponding holes through the roller cover tube 22 and, when using an outer tube 23, by means of corresponding holes. Since the control screw is set inwardly during operation, it is not in any way a mechanical obstruction. The braking effect, therefore, may be adjusted easily by the arrangement of this control screw from the outside, even when the braking rollers is mounted.

The braking roller as described may be modified while still retaining its advantages. For example, it is possible to arrange a storage chamber for the pressure liquid within the braking roller to make the operation independent of leakage. Also, it is possible that the pressure build-up in the housing may be used to press the friction areas of the friction clutch 29 against each other; in such a case, a hydraulically-operated clutch can be used so that the start-up resistance of heavy-duty braking rollers may be lowered even further. In all of these cases, a simply-designed braking roller is created and with it may be achieved high braking force with the desired progressive characteristics. By suitable design, a braking roller may be provided for extreme conditions, especially for high-temperature loadings or for the loading of heavy weights. This can be done by the exchange of the braking liquid for one of another viscosity and by change by means of the control screw adjustment. The characteristics of the braking resistance and the maximums of transport speed may be changed quickly and easily within wide limits.

The invention having been thus described, what is claimed as new and desired to secure by Letters Patent is:

1. A braking roller for use in a gravity conveyor comprising:
 (a) a roller tube with an inwardly extending flange at each end;
 (b) a pair of axially aligned stationary stub shafts on which the tube is rotatably supported by said flanges so as to extend over the entire width of the conveyor; and
 (c) a braking device located between the tube and one of the stub shafts and having a liquid as the braking medium, the braking device including a pump housing mounted in and connected to the roller tube, an internal gear connected to one of the stub shafts, a pinion gear connected to a first shaft which in turn is mounted in the pump housing, a first gear type rotor connected to the other end of said first shaft, a second gear type rotor engaging said first gear type rotor and rotatably mounted on a second shaft which in turn is mounted in said pump housing, said gear type rotors contained in a chamber in said pump housing.

2. The braking roller of claim 1, wherein a clutch is interposed between the one stub shaft and the pump.

3. The braking roller of claim 1, wherein a free-wheeling device is connected between the one stub shaft and the pump.

4. The braking roller of claim 1, wherein said internal gear and the one stub shaft are supported in bearings in the pump housing.

5. The braking roller of claim 1, wherein the pump has a restricted pressure-equalizing channel connecting the space on one side of said rotors with the space on the other side of said rotors.

6. The braking roller of claim 5, wherein the channel is provided with a control screw for adjusting the cross-sectional area of the channel.

7. The braking roller of claim 1, wherein the pump housing is mounted coaxially in the roller tube.

8. The braking roller of claim 1, wherein the roller tube is provided with a coaxial tubular cover spaced outwardly from the tube by flanges having holes therethrough for heat escape.

References Cited

UNITED STATES PATENTS

| | | | |
|---|---|---|---|
| 1,156,386 | 10/1915 | Armstrong | 193—35 X |
| 3,245,510 | 4/1966 | Cowan | 193—35 |
| 3,255,981 | 6/1966 | Wood | 188—92 X |

FOREIGN PATENTS

| | | |
|---|---|---|
| 408,215 | 1/1925 | Germany. |
| 200,412 | 12/1965 | Sweden. |

OTHER REFERENCES

German printed application 1,189,917, March 1965, Jourdan.

GEORGE E. A. HALVOSA, Primary Examiner

U.S. Cl. X.R.

188—92; 192—12